(12) United States Patent
Olin et al.

(10) Patent No.: US 6,722,131 B1
(45) Date of Patent: Apr. 20, 2004

(54) FUEL CONTROL VALVE

(75) Inventors: Brian S. Olin, Phoenix, AZ (US); Charles H. LaGrone, Tempe, AZ (US); Jason H. Roach, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/378,202

(22) Filed: Aug. 19, 1999

(51) Int. Cl.$^7$ .............................. F02G 3/00; F17D 1/14
(52) U.S. Cl. ..................................... 60/734; 137/625.12
(58) Field of Search .......................... 60/734, 746, 739, 60/39.281; 137/630.14, 630.15, 625.12

(56) References Cited

U.S. PATENT DOCUMENTS

| | | |
|---|---|---|
| 2,692,797 A | * 10/1954 | Wood et al. .................. 299/58 |
| 2,846,845 A | 8/1958 | Parker |
| 2,893,647 A | 7/1959 | Wortman |
| 2,921,747 A | 1/1960 | Burman |
| 3,016,705 A | 1/1962 | Kneidl et al. |
| 3,106,934 A | 10/1963 | Rogers et al. |
| 3,611,717 A | 10/1971 | Tissier |
| 4,027,474 A | * 6/1977 | Demase ................... 60/39.281 |
| 4,291,532 A | 9/1981 | Robinson |
| 4,711,085 A | 12/1987 | Lyons |
| 5,184,457 A | 2/1993 | Hseu et al. |
| 5,339,636 A | 8/1994 | Donnelly et al. |
| 5,368,273 A | 11/1994 | Dante |
| 5,528,897 A | 6/1996 | Halin |
| 5,735,117 A | 4/1998 | Toelle |
| 5,809,771 A | 9/1998 | Wernberg |

\* cited by examiner

*Primary Examiner*—Charles G. Freay
*Assistant Examiner*—Ehud Gartenberg
(74) *Attorney, Agent, or Firm*—Robert Desmond, Esq.

(57) ABSTRACT

A low hysterisis fuel control valve for proportioning fuel being supplied to the combustor of the turbine engine into a first portion for delivery to primary fuel nozzles and a second portion for delivery to secondary fuel nozzles is provided. The valve includes a piston mounted within a linear ball bearing bushing. In response to fuel pressure, the piston is continuously operable between a first position where said no fuel flow to the fuel nozzles occurs, a second position where fuel flows to the primary nozzles and a third position where fuel flows to the secondary nozzles.

10 Claims, 4 Drawing Sheets

FUEL CONTROL VALVE

TECHNICAL FIELD

This invention relates to fuel control systems for gas turbine engines, and in particular, to a fuel control valve for proportioning fuel being supplied to the combustor of the turbine engine into a first portion for delivery to primary fuel nozzles and a second portion for delivery to secondary fuel nozzles.

BACKGROUND OF THE INVENTION

FIG. 1 shows a prior art fuel control valve generally denoted by reference numeral 1. The fuel control valve 1 comprises a generally cylindrical, axially extending hogged out sleeve 2. The casing 2 has a first set of circumferentially spaced holes 3 and a second set of circumferentially spaced holes 4. Disposed within the casing 2 is a plate seal 5 having holes 6. The plate seal 5 has a hollow center and is coupled to valve 7. Disposed within the plate seal 5 and valve 7 is a piston 8 mounted on a spring 9. In operation fuel enters the inlet of 10 and flows through holes 3 and hole 6, pushing piston 8, then flowing out hole 4. As the fuel pressure builds within the interior, the piston moves and compresses the spring. Due to frictional engagement of the various parts, as the piston moves so does the valve 7 and the plate seal 5. A disadvantage to this prior art fuel control valve is that because of the frictional contact, hysterisis develops which makes the fuel flow from the valve unpredictable.

Accordingly, there is a need for a fuel control valve that overcomes this hysterisis problem.

SUMMARY OF THE INVENTION

An object of the present invention is to provide a fuel control valve that is not as susceptible to hysterisis as prior art valve.

The present invention achieves the above-stated objective by providing a fuel control valve for proportioning fuel being supplied to the combustor of the turbine engine into a first portion for delivery to primary fuel nozzles and a second portion for delivery to secondary fuel nozzles comprising:

an axially extending hollow casing having a first hole and a second hole axially spaced apart from said first hole, said first hole on fluid communication with said primary nozzles and said second hole in fluid communication with said secondary nozzles;

an annular metering block disposed within said casing, said metering block having a third hole in fluid communication with said first hole and a fourth hole in fluid communication with said second hole, said third and fourth hole being axially spaced from each other;

an annular bushing disposed in said casing adjacent said metering block to define a conduit extending through said casing from a first opening for receiving a flow of fuel and a second opening; and a stop valve disposed in said second opening and having a piston mounted thereto, said piston slidingly engaging said bushing to be continuously operable between a first position where said piston covers said third and fourth holes and a second position where said third and fourth holes are not covered by said piston.

These and other objects, features and advantages of the present invention are specifically set forth in, or will become apparent from, the following detailed description of a preferred embodiment of the invention then read in conjunction with the accompanying drawings.

DESCRIPTION OF THE PREFERRED EMBODIMENT

Figure 2:
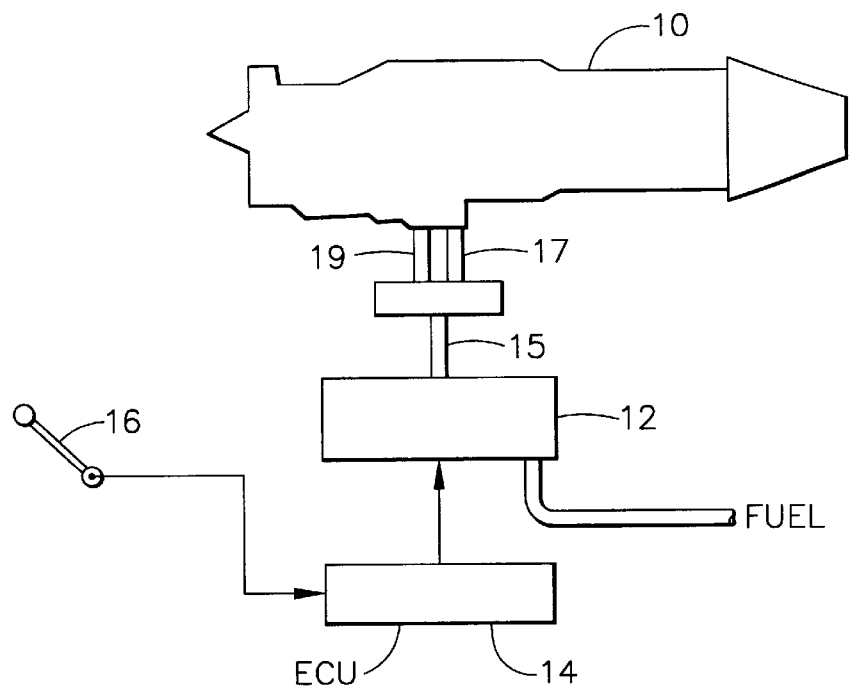
FIG. 2 is a schematic representation of a fuel control system for a gas turbine engine incorporating the fuel control valve contemplated by the present invention.

FIG. 2 shows a typical fuel delivery system for a gas turbine engine 10. Low pressure fuel from a supply tank, (not shown), is pumped to a main fuel control 12. The operation of the fuel control 12 is controlled by an electronic control unit 14 which receives commands from the cockpit 16. When commanded to deliver fuel to the engine 10, the fuel control 12 delivers fuel through a conduit 15 to the fuel control valve 20. In a manner more fully described later in the specification, the fuel control valve 20 delivers to the combustor of the turbine engine 10 a first portion of fuel through a conduit 19 to the combustor's primary fuel nozzles and a second portion of fuel through conduit 17 to the combustor's secondary fuel nozzles.

Figure 3:
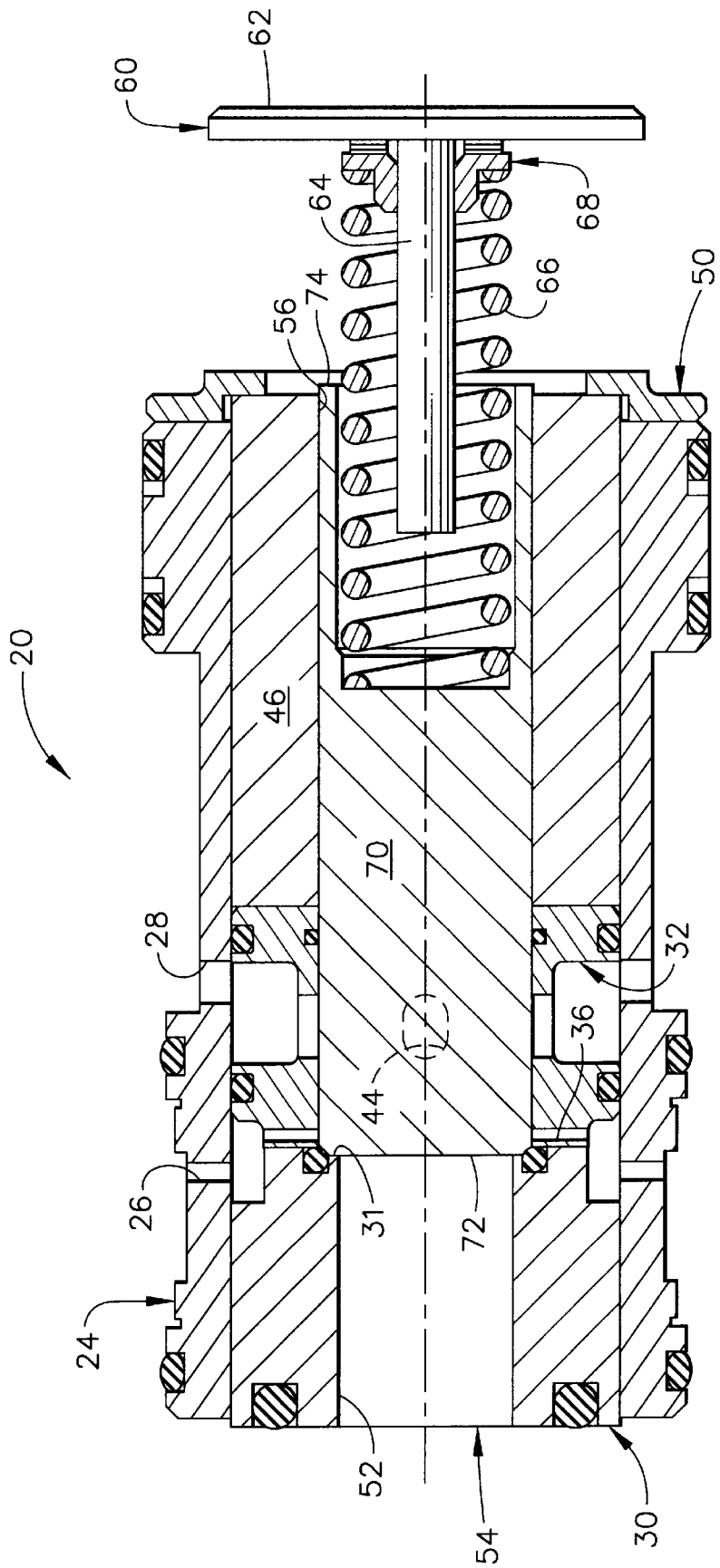
FIG. 3 is a cross-section of a fuel control valve contemplated by the present invention.

Referring to FIG. 3, the fuel control valve 20 is mounted inside a valve housing, not shown. The valve 20 comprises a generally cylindrical, axially extending hogged out casing 24. The casing 24 has a first set of circumferentially spaced holes 26 and a second set of circumferentially spaced holes 28. The two sets of holes are axially spaced from each other. In the preferred embodiment, each set has four holes equally spaced in the circumferential direction. However, the number and spacing of the holes may vary in alternate embodiments depending on the operating conditions of the valve.

Figure 4:
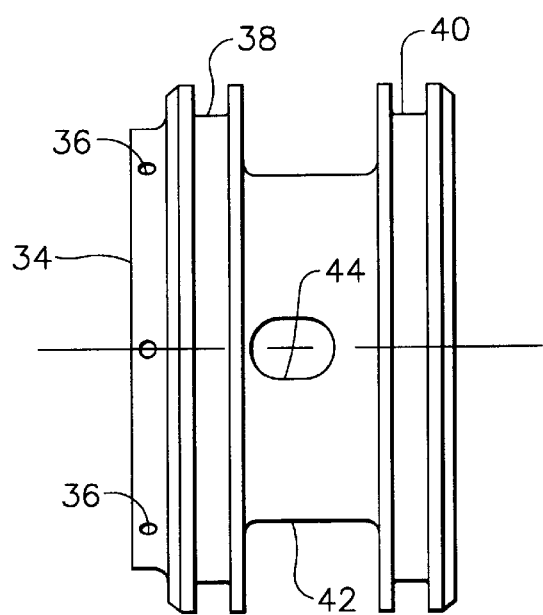
FIG. 4 is a profile view of a metering block of the fuel control valve of FIG. 3.

Viewing FIG. 3 from left-to-right, disposed within the casing 24 is a conventional annular spacer 30. Adjacent the spacer 30 is an annular metering block 32. The inner diameter of the spacer 30 is less than the inner diameter of the metering block 32 thereby defining an annular stop 31, the function of which will be described later in the specification. The metering block 32, which is shown in greater detail in FIG. 4, has a first rim portion 34 having a first diameter. Circumferentially disposed about the first rim 34 are six evenly spaced holes 36. It should be appreciated that the spacing and number of such holes may vary in alternate embodiments. Adjacent the rim 34 is a conventional o-ring receiver member 38 having a diameter greater than that of the rim 34. Axially spaced from the receiver member 38 is a second o-ring receiver member 40 at the same diameter as member 38. Disposed between members 38 and 40 is a recessed portion 42 having a diameter less than that of the rim 34. The recessed portion 42 has four circumferentially spaced holes 44. The holes 44 are evenly spaced and are oblong in the axial direction. Again, in alternate embodiments of the present invention, the number, spacing, and shape of the holes 44 may vary.

Referring again to FIG. 3 and continuing from left-to-right, adjacent the metering block 32 is an annular, linear ball bearing bushing 46. The bushing 46 is an antifriction device and is commercially available. In the preferred embodiment, the bushing 46 is procured, for example, from NB corporation, part number SM 16G. The spacer 30, metering block 32, and bushing 46 are held within the valve housing by a retainer spring 50 and together define a generally cylindrical conduit 52 extending all the way through the casing 24 from a first opening 54 to a second opening 56.

A stop valve 60 is comprised of a disc 62 and a rod 64 extending from the center of the disc 62. A helical spring 66 mounted over the rod 64 and a piston 70 is mounted over the helical spring. The spring and piston are held in place by a retainer spring 68. This assembly is inserted into the second opening 56 with a portion of the outer surface of the piston 70 slidingly engaging a portion of the inner surface of the bushing 46. The piston 70 is essentially a cylindrical member having a closed first end 72 and an opened second end 74 through which the spring 66 and rod 64 are received. The closed end 72 is dimensioned so that when the piston is extended all the way forward, (all the way left viewing FIG. 3), it abuts stop 31. With the piston abutting the stop 31 the valve 20 is closed.

Starting from this closed position, in response from a command from the cockpit 16, such as a command to start the engine 10, the electronic control unit 14 causes the fuel control 12 to deliver pressurized fuel through conduit 15 to the fuel control valve 20. This fuel flow is received through opening 54 into conduit 52 until it flows against the closed end 72 of the piston 70. As the pressure of the fuel increases it starts to overcome the force of spring 66 which holds the piston 70 in the closed position. As the spring force is overcome, the piston 70 retracts, that is it moves to the right viewing FIG. 3. As the piston 70 retracts holes 36 become opened and fuel flows through these holes, then through holes 26 and into conduit 17 to the primary fuel nozzles. This fuel flow is often referred to as the primary fuel flow. The fuel pressure in conduit 52 continues to build, the piston 70 continues to retract until oblong holes 44 open. Fuel then flows through these holes, through holes 28 into conduit 19 and then to the secondary fuel nozzles. This fuel flow is often referred to as the secondary fuel flow. When the engine is shut down the process is reversed as fuel pressure drops the piston 70 extends until it returns to the closed position.

Figure 1:
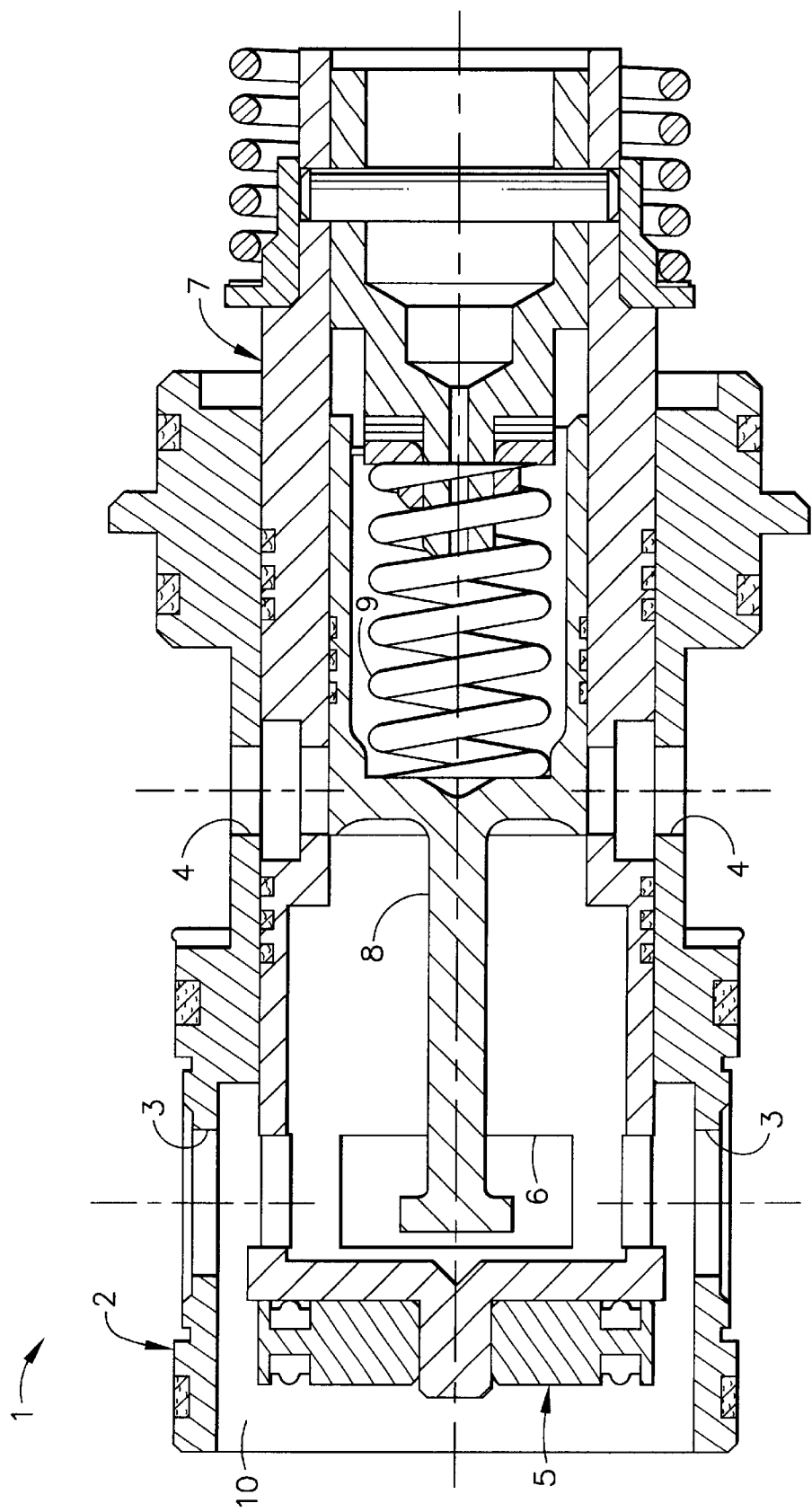
FIG. 1 is a cross-section of a prior art fuel control valve.
Figure 5:
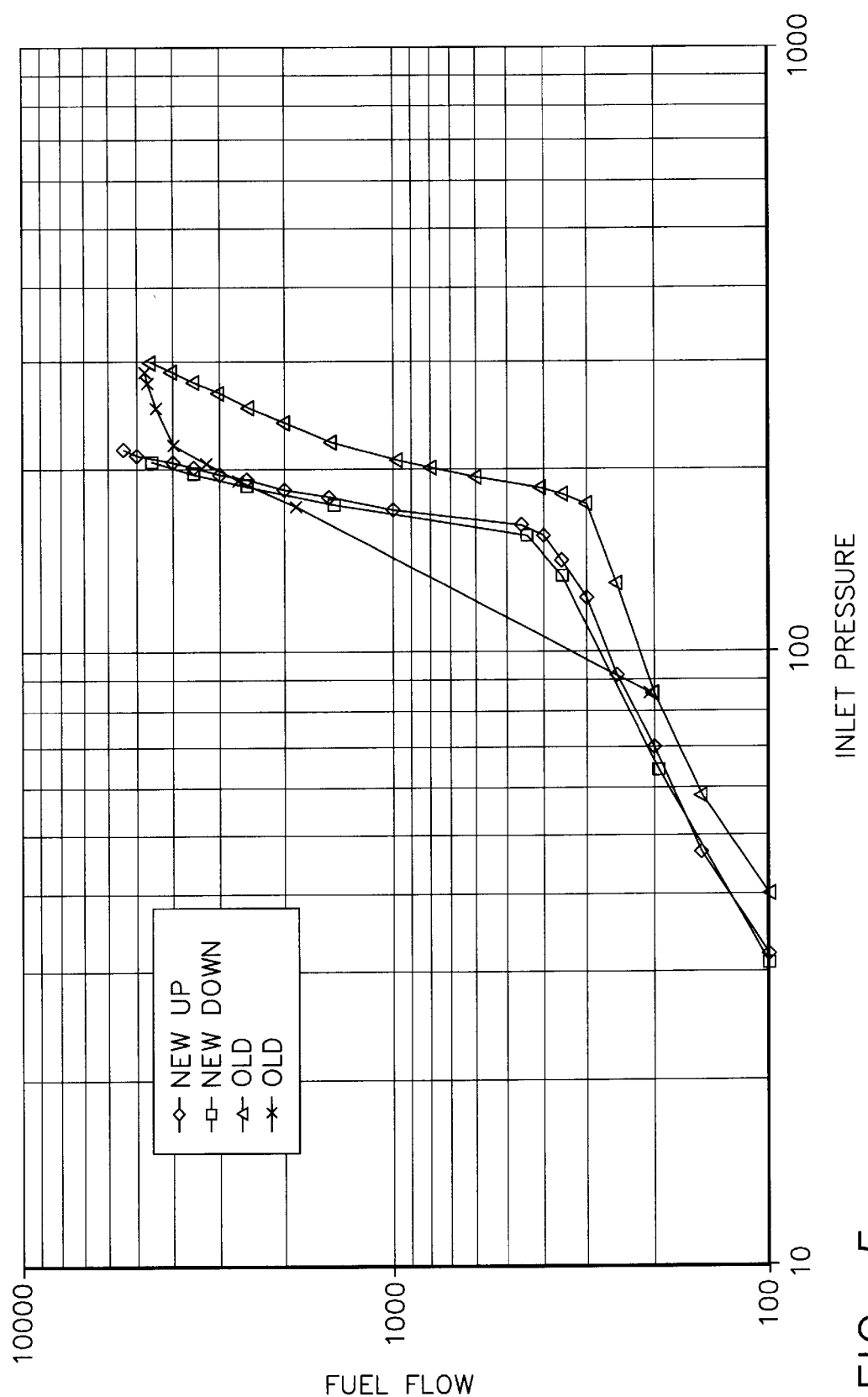
FIG. 5 is a graph of fuel flow vs. fuel pressure and compares the performance of a prior art fuel control valve with a fuel control valve contemplated by the present invention.

The advantages of fuel control valve 20 compared to the prior art fuel control valve shown in FIG. 1 can be seen in FIG. 5. FIG. 5 shows data from rig testing of both valves during a simulated engine start-up and shut-down. In FIG. 5 the y-axis is fuel flow and the x-axis is fuel pressure at the inlet to the valve. Data from a start-up sequence followed by shut-down sequence for the prior art valve, ("old") is represented by the triangles for start-up and "X"s for shut-down. From this graph the deficiency in the prior art valve is readily apparent as the start-up curve defined by the triangles is significantly different from the shut-down, "X"s. This difference is referred to as hysteresis and not only makes it difficult to calibrate the valve but can also impact the performance of the engine as predictability of fuel flow is lost. In contrast, the diamonds represent data from a simulated start-up using the valve contemplated by the present invention, ("new"), while the squares represent a shut-down. It is clear from FIG. 5 that the hysteresis found in the prior art valve has been eliminated. Another advantage to the present invention over the prior art is fewer parts and consequently lower cost.

Though the preferred embodiment has described the subject invention with reference to a gas turbine engine, the invention is equally applicable to other types of devices requiring metered flow. Accordingly, various modifications and alterations to the above described embodiments will be apparent to those skilled in the art and therefore this description of the invention should be considered exemplary in nature and not as limiting to the scope and spirit of the invention as set forth in the following claims.

What is claimed is:

1. A fuel control valve for proportioning fuel being supplied to the combustor of a turbine engine into a first portion for delivery to primary fuel nozzles and a second portion for delivery to secondary fuel nozzles comprising:

an axially extending hollow casing having a first hole and a second hole axially spaced apart from said first hole, said first hole on fluid communication with said primary nozzles and said second hole in fluid communication with said secondary nozzles;

an annular metering block disposed within said casing, said metering block having a third hole in fluid communication with said first hole and a fourth hole in fluid communication with said second hole, said third and fourth hole being axially spaced from each other;

an annular bushing disposed in said casing adjacent said metering block to define a conduit extending through said casing from a first opening for receiving a flow of fuel and a second opening; and a stop valve disposed in said second opening and having a piston mounted thereto, said piston slidingly engaging said bushing to be continuously operable between a first position where said piston covers said third and fourth holes and a second position where said third and fourth holes are not covered by said piston.

2. The fuel control valve of claim 1 wherein said bushing is a linear ball bearing bushing.

3. The fuel control valve of claim 1 wherein said piston has a first end in fluid communication with the fuel flow entering said first opening, whereby said piston moves between said first and second position in response to the pressure of the fuel.

4. The fuel control valve of claim 1 further comprising an annular spacer disposed in said casing adjacent said metering block.

5. The fuel control valve of claim 4 wherein said annular spacer has a stop for stopping the movement of said piston when it reaches said first position.

6. The fuel control valve of claim 5 wherein said stop is defined by the annular spacer having an inside diameter less than the inside diameter of said metering block.

7. The fuel control valve of claim 1 wherein said stop valve comprises a rod extending from the center of a disc.

8. The fuel control valve of claim 7 wherein a resilient member is disposed between said piston and said disc.

9. The fuel control valve of claim 8 wherein said resilient member is mounted over said rod.

10. The fuel control valve of claim 9 wherein said resilient member is a helical spring.

* * * * *